US010205985B2

(12) United States Patent
Lue-Sang et al.

(10) Patent No.: US 10,205,985 B2
(45) Date of Patent: Feb. 12, 2019

(54) MANAGEMENT OF THE CHANNEL BAR

(71) Applicant: Apple Inc., Cupertino, CA (US)

(72) Inventors: Ronald D. Lue-Sang, Union City, CA (US); Christopher L. Oklota, San Francisco, CA (US); Nimrod Gat, San Francisco, CA (US); Roger Pantos, Cupertino, CA (US); Simon Goldrei, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/674,992

(22) Filed: Aug. 11, 2017

(65) Prior Publication Data

US 2017/0339443 A1 Nov. 23, 2017

Related U.S. Application Data

(63) Continuation of application No. 15/507,225, filed as application No. PCT/US2014/057272 on Sep. 24, 2014.

(51) Int. Cl.
*H04N 21/222* (2011.01)
*H04N 21/258* (2011.01)
(Continued)

(52) U.S. Cl.
CPC ........... *H04N 21/2662* (2013.01); *G06F 9/50* (2013.01); *H04N 21/2358* (2013.01);
(Continued)

(58) Field of Classification Search
CPC ......... H04N 21/2225; H04N 21/25825; H04N 21/42204; H04N 21/4312; H04N 21/4314; H04N 21/4316
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002
(Continued)

OTHER PUBLICATIONS

Notice of Allowance dated Aug. 29, 2017, for U.S. Appl. No. 14/255,664, filed Apr. 17, 2014, four pages.
(Continued)

*Primary Examiner* — Dominic D Saltarelli
(74) *Attorney, Agent, or Firm* — Morrison & Foerster LLP

(57) ABSTRACT

Videos may be loaded to an electronic device at any of a plurality of bitrates, each bitrate corresponding to a certain video quality level. The bitrate selected may be based on, for example, bandwidth capabilities and/or video quality standards. However, bandwidth capabilities may be taxed or exceeded if multiple videos are loaded simultaneously to the electronic device. Examples of the disclosure can be used to manage bandwidth, adjust bitrates, and/or selectively load video and audio in accordance with bandwidth capabilities to provide uninterrupted video playback at a relatively high quality. Further, video players may be allocated in memory and re-used as a user scrolls and switches through a number of videos playing onscreen concurrently.

22 Claims, 18 Drawing Sheets

(51) Int. Cl.

| | |
|---|---|
| ***H04N 21/422*** | (2011.01) |
| ***H04N 21/431*** | (2011.01) |
| ***H04N 21/2662*** | (2011.01) |
| ***G06F 9/50*** | (2006.01) |
| ***H04N 21/235*** | (2011.01) |
| ***H04N 21/442*** | (2011.01) |
| ***H04N 21/443*** | (2011.01) |
| ***H04N 21/438*** | (2011.01) |

(52) U.S. Cl.
CPC ..... *H04N 21/4312* (2013.01); *H04N 21/4383* (2013.01); *H04N 21/443* (2013.01); *H04N 21/4424* (2013.01)

(58) Field of Classification Search
USPC .......................................... 725/41, 43, 44, 52
See application file for complete search history.

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 5,886,690 | A | 3/1999 | Pond et al. |
| 6,028,600 | A | 2/2000 | Rosin et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 9,774,917 | B1 | 9/2017 | Christie et al. |
| 2003/0005445 | A1 | 1/2003 | Schein et al. |
| 2003/0088872 | A1 | 5/2003 | Maissel et al. |
| 2006/0107304 | A1 | 5/2006 | Cleron et al. |
| 2006/0197753 | A1 | 9/2006 | Hotelling |
| 2008/0222677 | A1 | 9/2008 | Woo et al. |
| 2008/0307459 | A1 | 12/2008 | Migos |
| 2009/0322962 | A1 | 12/2009 | Weeks |
| 2010/0057696 | A1 | 3/2010 | Miyazawa et al. |
| 2010/0333143 | A1 | 12/2010 | Civanlar et al. |
| 2013/0024895 | A1 | 1/2013 | Yong et al. |
| 2013/0061234 | A1 | 3/2013 | Piira et al. |
| 2013/0132966 | A1 | 5/2013 | Chanda et al. |
| 2014/0278072 | A1 | 9/2014 | Fino et al. |
| 2017/0300151 | A1 | 10/2017 | Lue-Sang et al. |
| 2018/0041814 | A1 | 2/2018 | Christie |

FOREIGN PATENT DOCUMENTS

| | | | |
|---|---|---|---|
| KR | 10-2001-0005939 | A | 1/2001 |
| KR | 10-2011-0061811 | A | 6/2011 |
| WO | WO-99/40728 | A1 | 8/1999 |
| WO | 2011/095693 | A1 | 8/2011 |
| WO | 2013/149128 | A2 | 10/2013 |
| WO | 2013/149128 | A3 | 10/2013 |

OTHER PUBLICATIONS

Bohn, D. (Jan. 6, 2014). "Rebooting webOS: how LG rethought the smart TV," located at: http://www.theverge.com/2014/1/6/5279220/rebooting-webos-how-lg-rethought-the-smart-tv, last visited: Feb. 24, 2014, seven pages.
Final Office Action dated Oct. 17, 2016, for U.S. Appl. No. 14/255,664, filed Apr. 17, 2014, fifteen pages.
Grey, M. (Jun. 11, 2013). "Comcast's new X2 platform moves your DVR recordings from the box to the cloud," located at: http://www.engadget.com/2013/06/11/comcast-x2-platform/ last visited: Feb. 24, 2014, fifteen pages.
Lee, S.K. et al. (Apr. 1985). "A Multi-Touch Three Dimensional Touch-Sensitive Tablet," *Proceedings of CHI: ACM Conference on Human Factors in Computing Systems,* pp. 21-25.
Non-Final Office Action dated Apr. 1, 2016, for U.S. Appl. No. 14/255,664, filed Apr. 17, 2014, fourteen pages.
Notice of Allowance dated May 5, 2017, for U.S. Appl. No. 14/255,664, filed Apr. 17, 2014, seven pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Notice of Allowance dated May 22, 2018, for U.S. Appl. No. 15/714,904, filed Sep. 25, 2017, seven pages.
Notice of Allowance (corrected) dated Sep. 7, 2018, for U.S. Appl. No. 15/714,904, filed Sep. 25, 2017, four pages.

MANAGEMENT OF THE CHANNEL BAR

FIELD OF THE DISCLOSURE

This application is a continuation of U.S. patent application Ser. No. 15/507,225 filed Feb. 27, 2017, which is a National Phase Patent Application under 35 U.S.C. § 371 of International Application No. PCT/US2014/057272, filed Sep. 24, 2014, the entire disclosures of which are incorporated herein by reference for all purposes.

FIELD OF THE DISCLOSURE

This relates generally to an interface for presenting video.

BACKGROUND OF THE DISCLOSURE

Videos may be loaded to an electronic device at any of a plurality of bitrates, each bitrate corresponding to a certain video quality level. The bitrate selected may be based on, for example, bandwidth capabilities and/or video quality standards. However, bandwidth capabilities may be taxed or exceeded if multiple videos are loaded simultaneously to the electronic device.

SUMMARY OF THE DISCLOSURE

Videos may be loaded to an electronic device at any of a plurality of bitrates, each bitrate corresponding to a certain video quality level. The bitrate selected may be based on, for example, bandwidth capabilities and/or video quality standards. However, bandwidth capabilities may be taxed or exceeded if multiple videos are loaded simultaneously to the electronic device. Examples of the disclosure can be used to manage bandwidth, adjust bitrates, and/or selectively load video and audio in accordance with bandwidth capabilities to provide uninterrupted video playback at a relatively high quality. Further, video players may be allocated in memory and re-used as a user scrolls and switches through a number of videos playing onscreen concurrently.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Videos may be loaded to an electronic device at any of a plurality of bitrates, each bitrate corresponding to a certain video quality level. The bitrate selected may be based on, for example, bandwidth capabilities and/or video quality standards. However, bandwidth capabilities may be taxed or exceeded if multiple videos are loaded simultaneously to the electronic device. Examples of the disclosure can be used to manage bandwidth, adjust bitrates, and/or selectively load video and audio in accordance with bandwidth capabilities to provide uninterrupted video playback at a relatively high quality. Further, video players may be allocated in memory and re-used as a user scrolls and switches through a number of videos playing onscreen concurrently. Videos may be loaded from local storage (e.g., hard disk drive, solid state drive, optical disk, etc.), from a remote device over a network such as the Internet (e.g., from a streaming video service, a separate device on the same local area network, network-connected digital video recorder (DVR), etc.), or from a live television stream (e.g., an over-the-air (OTA) broadcast, a live cable stream, a live Internet stream, etc.).

Although examples disclosed herein may be described and illustrated herein primarily in terms of a channel bar including a plurality of videos, it should be understood that the examples are not so limited, but are additionally applicable to methods of bandwidth management in video streaming more generally.

Figure 1:
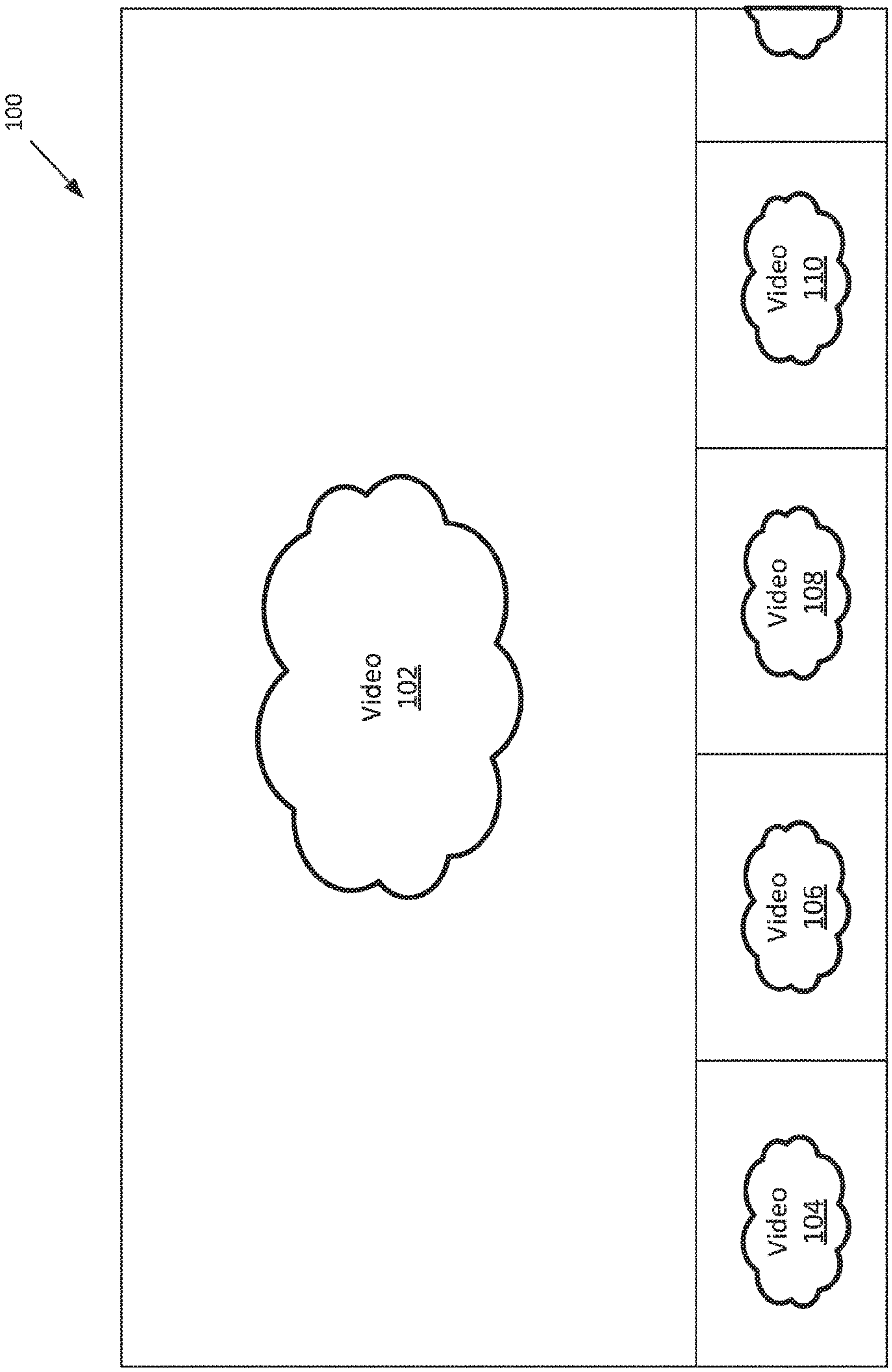
FIG. 1 illustrates an exemplary user interface of an electronic device displaying a plurality of videos simultaneously according to examples of the disclosure.

FIG. 1 illustrates an exemplary user interface 100 of an electronic device displaying a plurality of videos 102-110 simultaneously according to examples of the disclosure. The user interface 100 may include a first video 102 and a channel bar including additional videos 104, 106, 108, and 110. The first video 102 may be displayed larger than the additional videos 104-110 in the channel bar (e.g., the first video may be displayed full-screen), and the additional videos may overlay the first video 102 along an edge of the user interface 100. In some examples, only audio associated with the first video 102 may be played by the electronic device. User input may be received by the electronic device to browse to any of the additional videos 104-110 in the channel bar (e.g., by moving a cursor to one of the additional videos, or causing one of the additional videos to be highlighted, among other possibilities), and user input may be received to select one of the videos. In response to selection of one of the additional videos in the channel bar, the selected video may be displayed in place of the first video 102 and audio associated with the selected video may be played by the electronic device.

Figure 2:
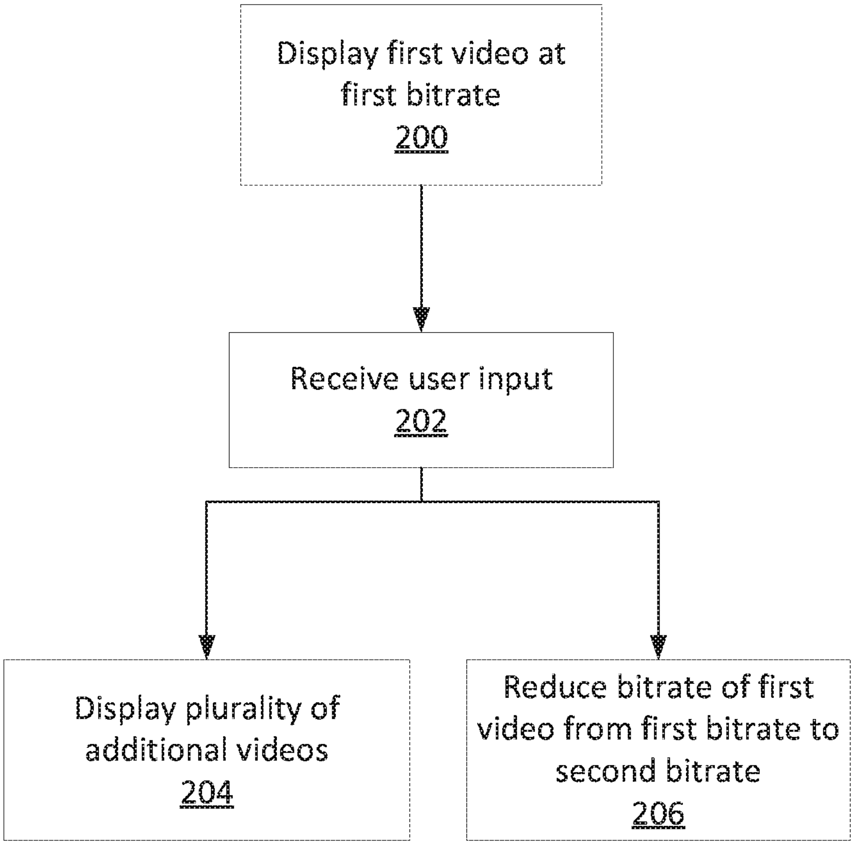
FIG. 2 illustrates an exemplary method of displaying a plurality of videos according to examples of the disclosure.

FIG. 2 illustrates an exemplary method of displaying a plurality of videos according to examples of the disclosure. A first video may be displayed at a first bitrate, the first video being available for display at first and second bitrates, the second bitrate being lower than the first bitrate (200). In some examples, a video may be available at a plurality of bitrates, and each bitrate may correspond to a specific video resolution or a video quality level. For example, a video may be available for display at 8,000 kbps (kilobits per second), 4,000 kbps, and 1,500 kbps. In some examples, the 8,000 kbps bitrate may correspond to a high quality video at a resolution of 1920 pixels by 1080 pixels, the 4,000 kbps bitrate may correspond to a medium quality video at a resolution of 1280 pixels by 720 pixels, and the 1,500 kbps bitrate may correspond to a low quality video at a resolution of 854 pixels by 480 pixels.

User input may be received (202). User input may include any kind of user interaction received by the electronic device, the interaction being at the electronic device itself or at some other device in communication with the electronic device. For example, the electronic device may receive a signal indicating that a user has pressed a channel button on a remote control.

In response to the user input, a plurality of additional videos may be displayed (204). For example, a channel bar including a plurality of additional videos may displayed as illustrated in FIG. 1. Also in response to the user input, the bitrate of the first video may be reduced from the first bitrate to the second bitrate (206). That is, the first video may be displayed at the second bitrate instead of at the higher first bitrate. Given that the user has caused the display of the channel bar, less attention may be paid to the first video and thus the reduction of quality may be less noticeable. In this way, the electronic device can reduce the bandwidth load of displaying a full-screen first video and a plurality of additional videos on a channel bar. In some examples, the bitrate of the first video may be increased from the second bitrate to the first bitrate in response to user input causing the channel bar to be hidden.

Figure 3:
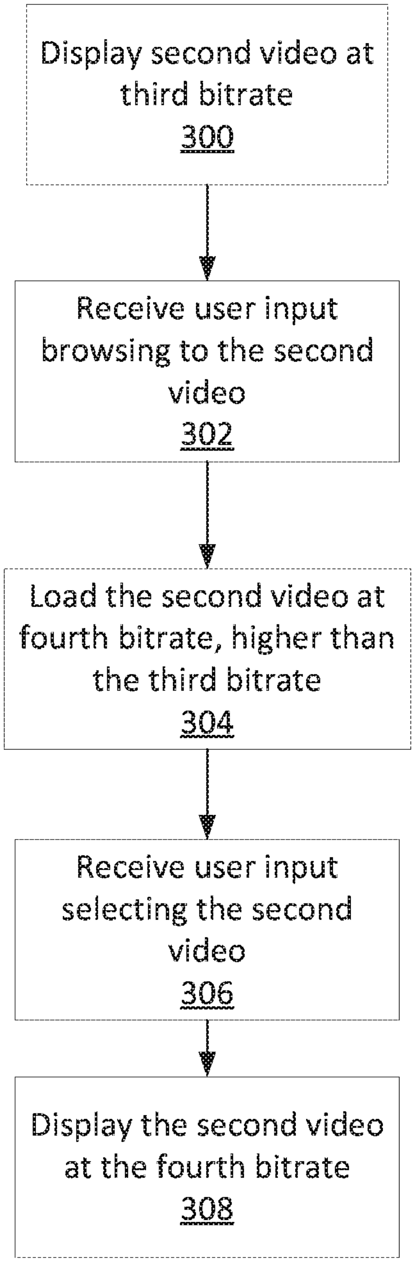
FIG. 3 illustrates an exemplary method of displaying a plurality of videos according to examples of the disclosure.

FIG. 3 illustrates an exemplary method of displaying a plurality of videos according to examples of the disclosure. To allow for uninterrupted playback of video, a video may be loaded before it is actually displayed by the electronic device—that is, a portion of the video may be loaded so that it can be displayed immediately and without interruption once playback is requested by a user.

A second video may be displayed at a third bitrate, the second video being available for display at third and fourth bitrates (300). The second video may be displayed as part of a channel bar, and the third bitrate may be lower than a first bitrate of a first video displayed full-screen, as illustrated in FIG. 1.

User input browsing to the second video may be received (302). For example, user input may be received indicating that a user pressed a directional button on a remote control, and a cursor may be moved to the second video. In response to the user input, the second video may be loaded at the fourth bitrate, higher than the third bitrate (304). In this way, it can be anticipated that the user might select the second video for display, and the loading of the second video at the fourth bitrate can prepare the second video to be displayed immediately at the fourth bitrate should the user select the second video. In some examples, audio associated with the second video may also be loaded in response to the user input browsing to the second video.

User input may be received selecting the second video (306). For example, user input may be received indicating that a user pressed a selection button on a remote control. In response to the user input, the second video may be displayed at the fourth bitrate (308). In some examples, in response to the user input selecting the second video, the second video may be displayed full-screen in place of the first video, as discussed above with reference to FIG. 1.

Figure 4:
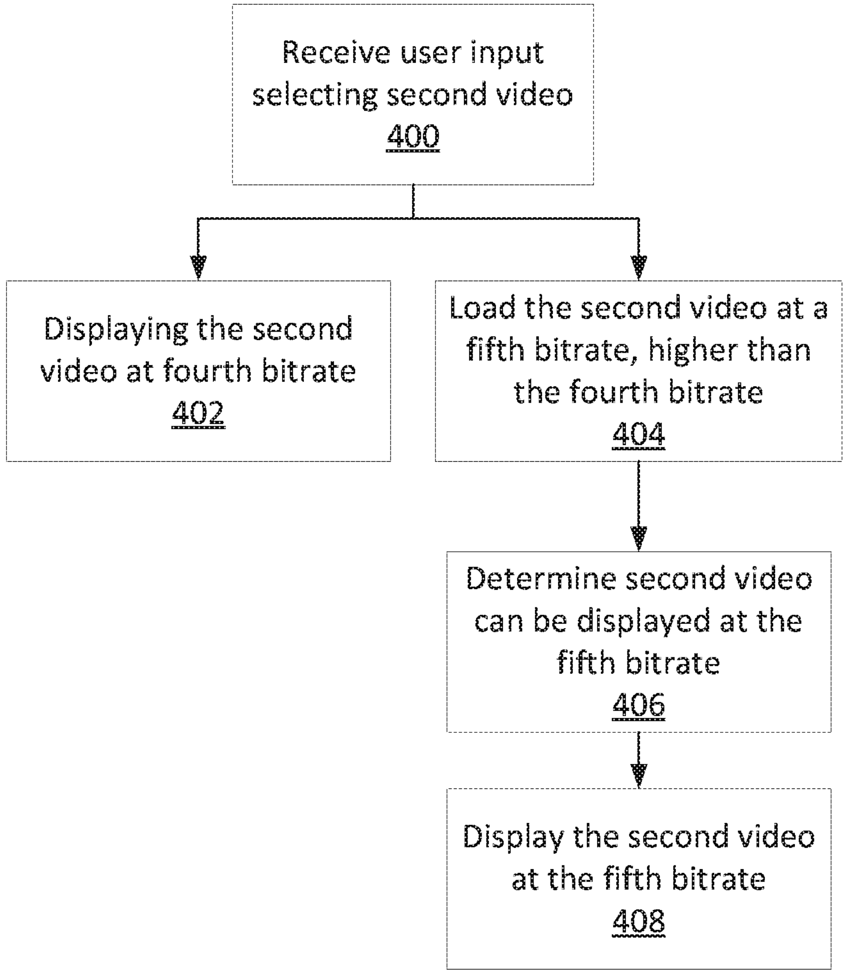
FIG. 4 illustrates an exemplary method of displaying a plurality of videos according to examples of the disclosure.

FIG. 4 illustrates an exemplary method of displaying a plurality of videos according to examples of the disclosure. To facilitate uninterrupted viewing when a user selects a video from a channel bar, the selected video may be immediately displayed at a relatively low bitrate while the video is loaded at a higher bitrate, and then the video can be displayed at the higher bitrate once enough of the video has been loaded.

User input may be received selecting a second video (e.g., a video displayed in a channel bar, as illustrated in FIG. 1) (400). In response to the user input, the second video may be displayed at a fourth bitrate (402). For example, the second video may be displayed full-screen in place of a first video. Also in response to the user input selecting the second video, the second video may be loaded at a fifth bitrate higher than the fourth bitrate (404). Then, it can be determined that the second video can be displayed at the fifth bitrate (406). For example, the electronic device can monitor the loading of the second video at the fifth bitrate until enough of the video has been loaded such that the second video can be displayed at the fifth bitrate without interruption. In some examples, the determination may be based on bandwidth capabilities of the electronic device. In response to the determination, the second video may be displayed at the fifth bitrate (408).

Figure 5A:
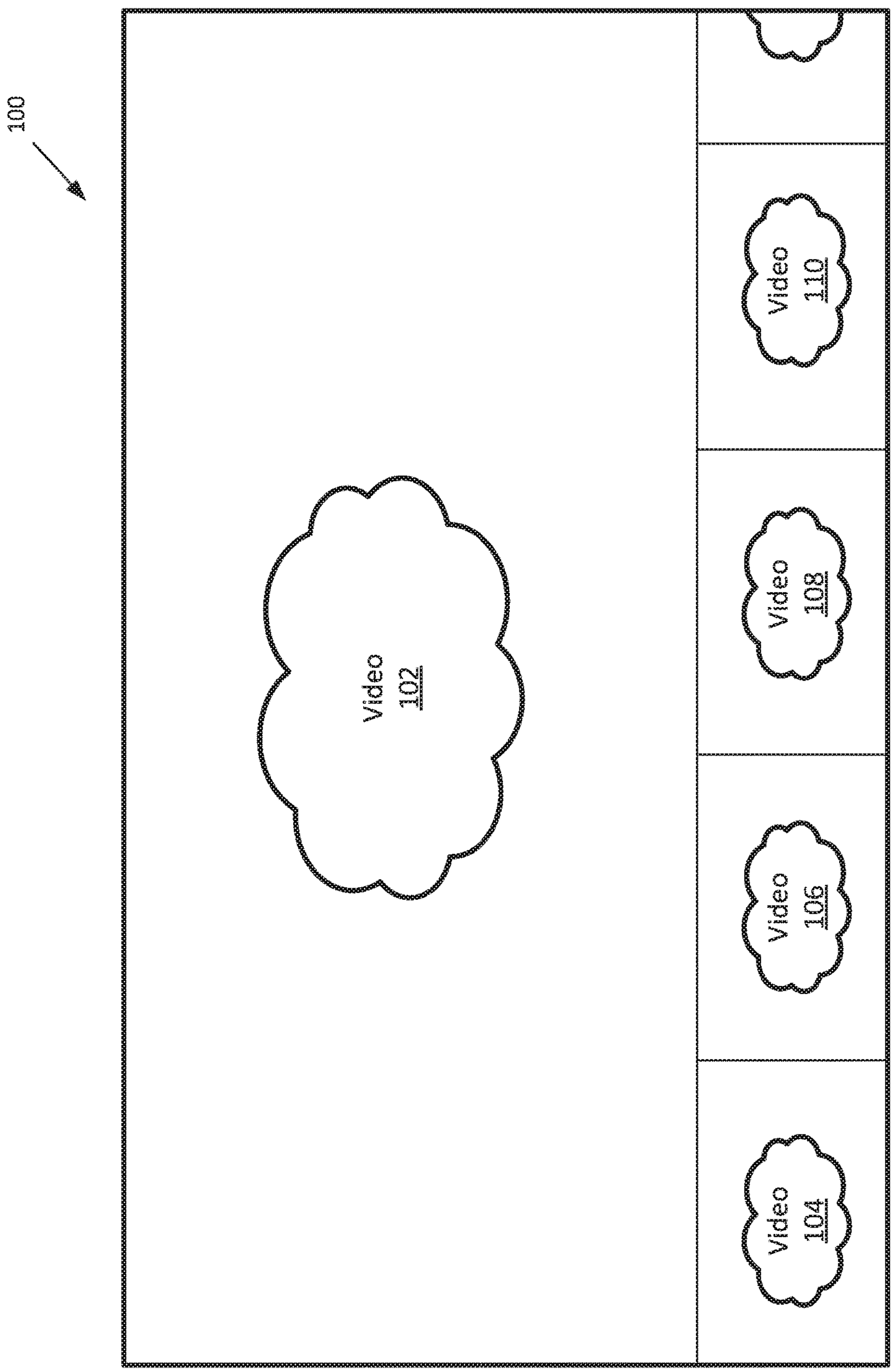
FIGS. 5A-B illustrate an exemplary user interface of an electronic device displaying a horizontal scrolling animation of a plurality of videos according to examples of the disclosure.
Figure 5B:
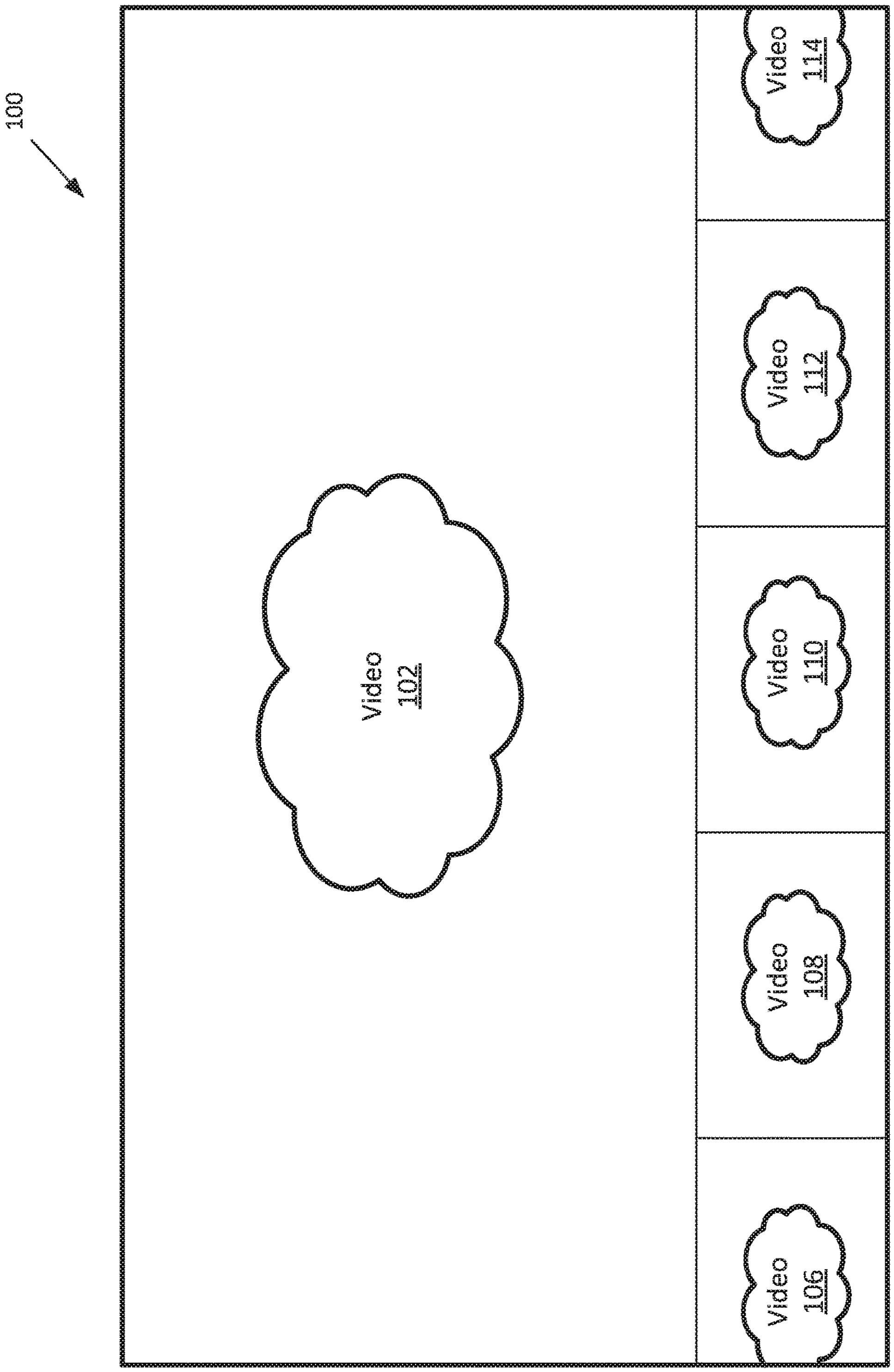

FIGS. 5A-B illustrate an exemplary user interface of an electronic device displaying a horizontal scrolling animation of a plurality of videos according to examples of the disclosure. FIG. 5A illustrates an exemplary user interface 100 displaying a plurality of videos 102-110 simultaneously. The user interface 100 may include a first video 102 and a channel bar including additional videos 104-110. User input may be received to horizontally scroll the channel bar, and FIG. 5B illustrates the exemplary user interface 100 after horizontal scroll. Each of the videos 104-110 may shift horizontally such that video 104 may be completed offscreen, video 106 may be partially offscreen, and videos 112 and 114 may be scrolled onscreen.

In some examples, a plurality of video players may be allocated in memory, one or more of the players may be displayed onscreen, and one or more of the players may not be displayed. For example, each of videos 104-110 may be initially displayed in an allocated video player. Further, videos 112 and 114 may each be loaded into an allocated video player even before the video players are displayed in FIG. 5B, such that the videos may be ready to play when they are displayed. In some examples, a video player may continue to be used after it has been moved offscreen. For example, the video 104 may continue to be loaded in its player after it has been moved offscreen in FIG. 5B, such that the video may be ready to play if the user scrolls back in the other direction to bring video 104 back onscreen.

In some examples, allocated video players may be reused. For example, after video 104 is scrolled offscreen, video 104 may be removed from its corresponding player and that player may be reused and loaded with video 114 so that when video 114 is scrolled onscreen the video may be ready to play without allocating an additional player.

Figure 6A:
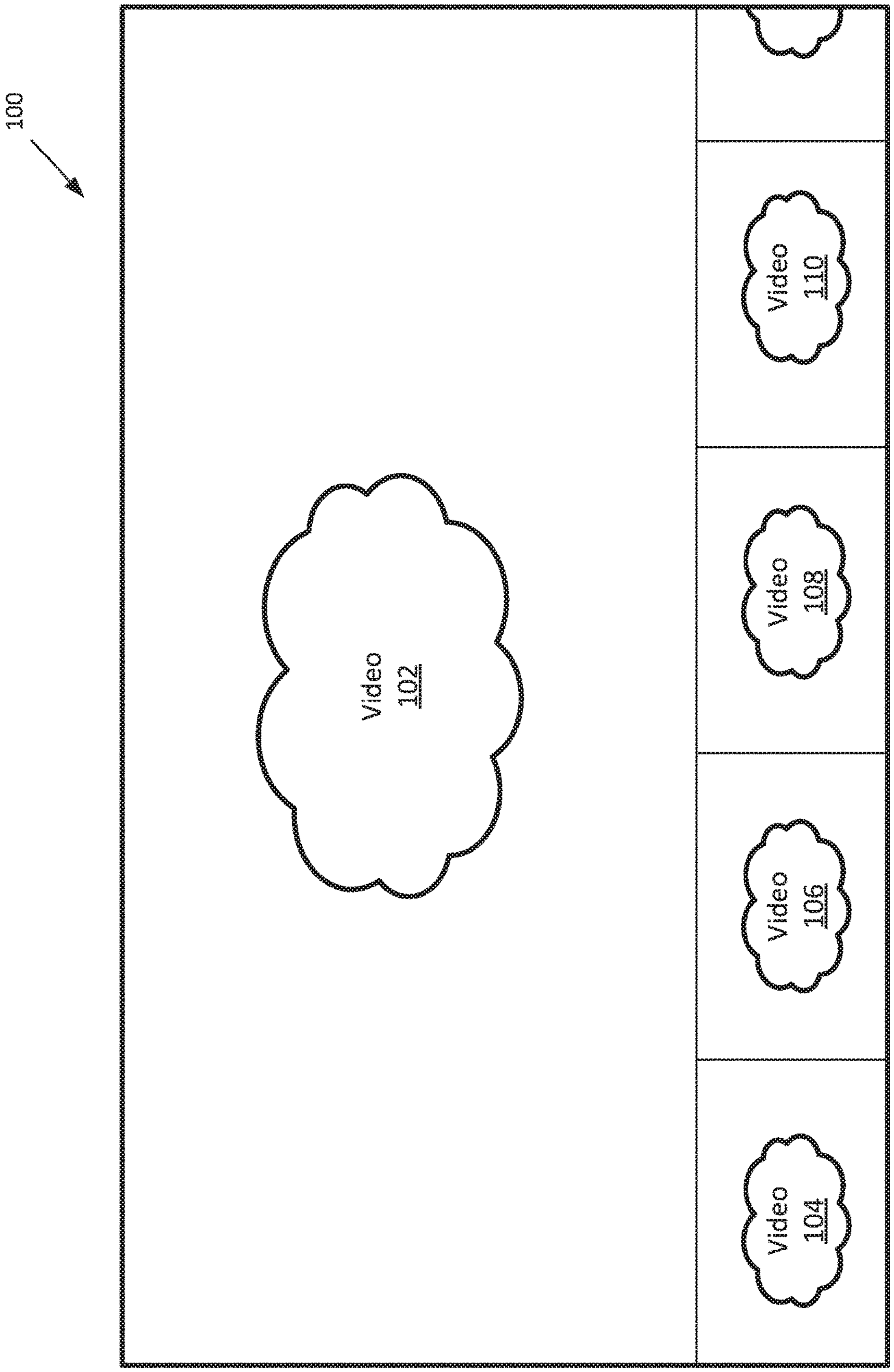
FIGS. 6A-D illustrate an exemplary user interface of an electronic device displaying a vertical scrolling animation of a plurality of videos according to examples of the disclosure.
Figure 6B:
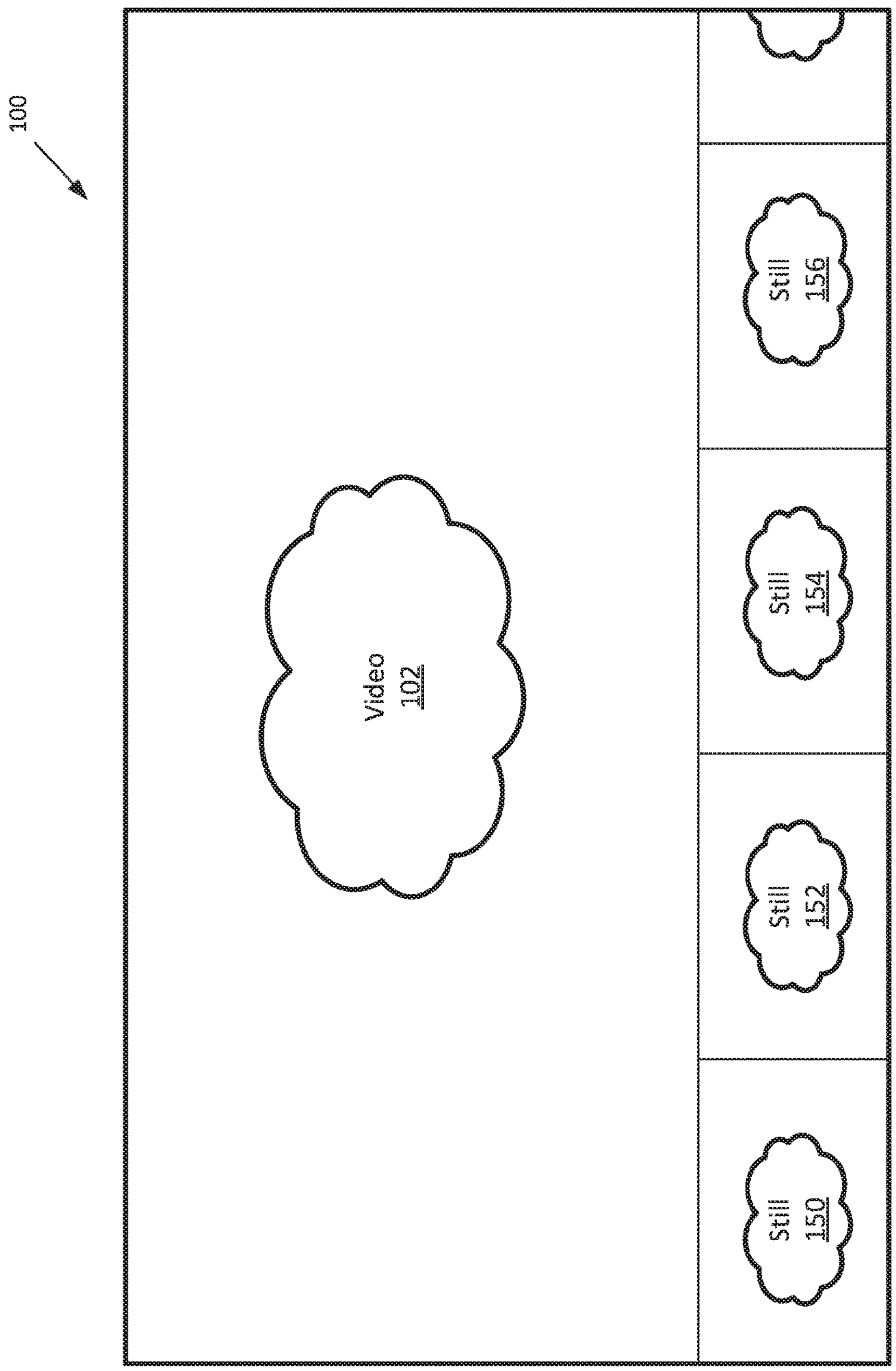
Figure 6C:
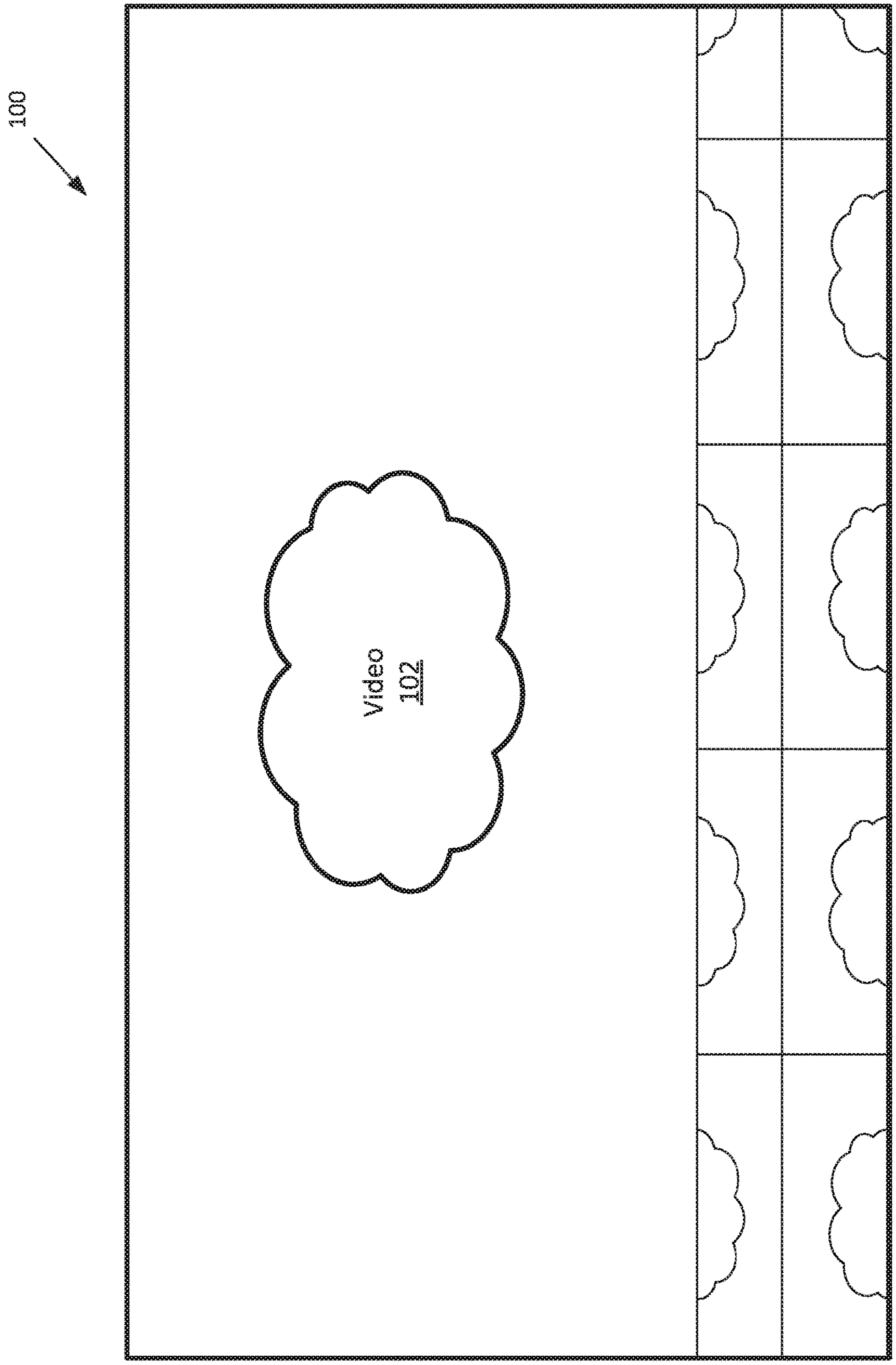
Figure 6D:
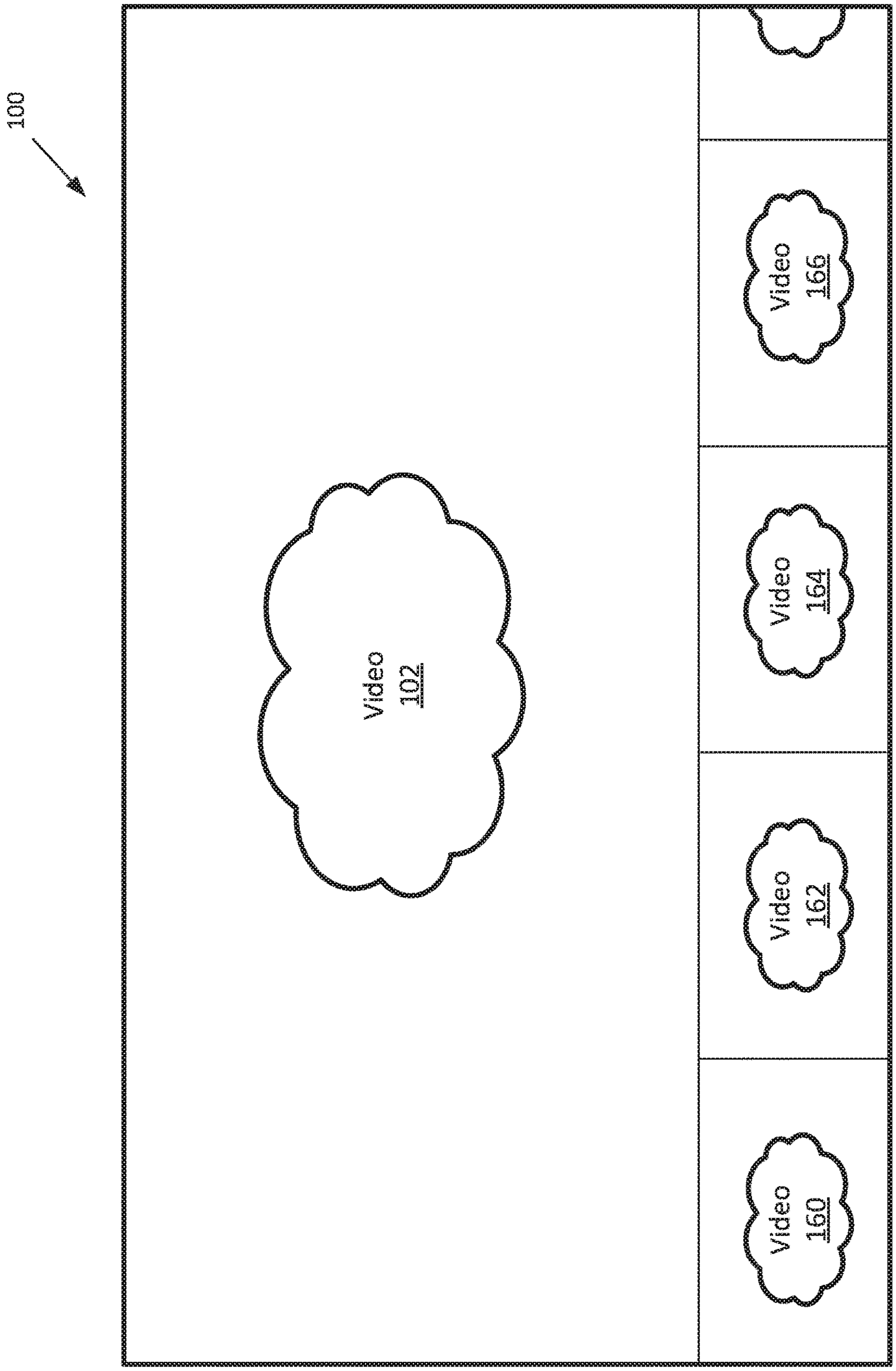

FIGS. 6A-D illustrate an exemplary user interface of an electronic device displaying a vertical scrolling animation of a plurality of videos according to examples of the disclosure. In some examples, a channel bar may be scrolled vertically or otherwise, such that all the videos disappear from the channel bar, and an additional plurality of videos populate the channel bar. This process may be completed without allocating any additional video players. FIG. 6A illustrates a channel bar with videos 104-110. User input may be received to vertically scroll the channel bar. In preparation for the scroll, each of the videos 104-110 may be replaced with a still image (each of still images 150-156), as illustrated in FIG. 6B. The still image may be a placeholder image. For example, the still image may be the last displayed frame of the corresponding video. Then, each of the video players allocated for the channel bar may be loaded with a different video from the additional plurality of videos (i.e., the new videos to be displayed once the scrolling is complete), and the players may be repositioned offscreen so that they can be animated as gradually appearing onscreen. FIG. 6C illustrates the plurality of additional videos gradually appearing onscreen, as they move up from the bottom edge of the user interface 100, and the still images gradually disappearing from the user interface as they move upward. Once the scrolling is complete, the additional plurality of videos 160-166 may be displayed in the user interface 100, as illustrated in FIG. 6D. Although FIGS. 6A-6D illustrate still images moving offscreen while new videos move onscreen, other methods of scrolling videos are contemplated. For example, the still images may gradually fade out while new videos gradually fade in, or still images may gradually shrink, among other possibilities.

Figure 7:
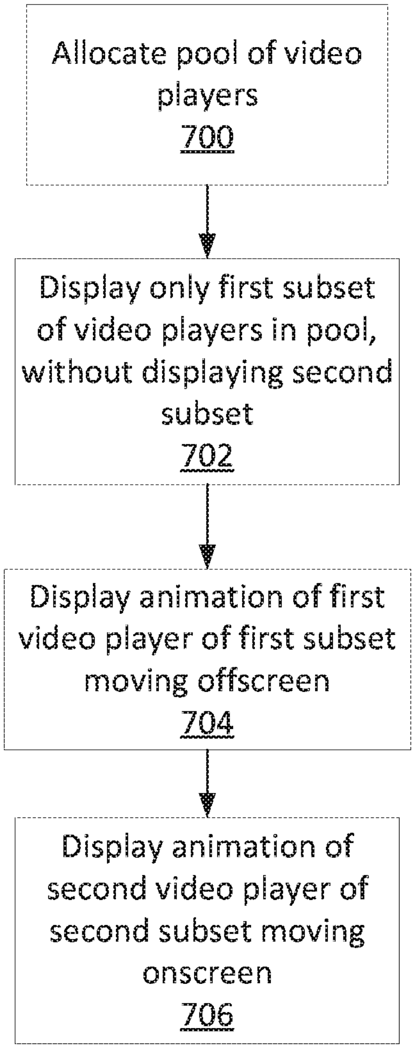
FIG. 7 illustrates an exemplary method of allocating a plurality of video players according to examples of the disclosure.

FIG. 7 illustrates an exemplary method of allocating a plurality of video players according to examples of the disclosure. A pool of video players for a channel bar may be allocated in memory (700). For example, a plurality of video player data structures may be generated in memory, each corresponding to a video player in the pool. Each video player may have a number of attributes, including an address of associated video content, a position with respect to a user interface, a visibility flag indicating whether the video player should be displayed, and/or a playback flag indicating whether the video player should currently load and play associated video content, among other possibilities.

In some examples, it may be determined that an additional video player is needed, and an additional video player may be allocated in memory for the pool. The additional video player may be displayed subsequent to its allocation. In some examples, a maximum number of video players for the pool may be determined, and an additional video player may not be allocated if the video pool already includes the maximum number of video players. In some examples, the maximum number may be determined based on a system constraint, such as a bandwidth constraint, a memory constraint, and/or a processing constraint, among other possibilities.

A video player may be allocated in memory as part of the pool without being displayed onscreen. In some examples, only a first subset of the video players in the pool may be displayed, without displaying a second subset of the video players (702). Further, each video of the first subset may be playing video content. A video player may not be displayed due to a visibility flag indicating that the video player should not be displayed, or in some cases a video player may not be displayed because its position with respect to the user interface disposes the video player outside a viewable area of the user interface, among other possibilities.

An animation of a first video player of the first subset moving offscreen may be displayed, such that the first video player may no longer be displayed onscreen following the animation (704). An example of such an animation is illustrated in FIGS. 5A-B, where video 104 moves to the left with respect to user interface 100 until it is no longer displayed in FIG. 5B. In some examples, the video content may no longer be loaded in the video player corresponding to video 104, such that the video player may be reused for other video content. In some examples, the video content may continue to be loaded in the video player, in case the user intends to scroll video 104 back onscreen.

An animation of a second video player of the second subset moving onscreen may be displayed, such that the second video player may be displayed onscreen following the animation (706). An example of such an animation is illustrated in FIGS. 5A-B, where video 114 moves to the left with respect to user interface 100 until it is displayed onscreen in FIG. 5B. In some examples, the second video player may begin loading video content prior to displaying the animation, such that the video content may be fully loaded or partially loaded by the time video 114 is displayed onscreen following the animation.

Figure 8:
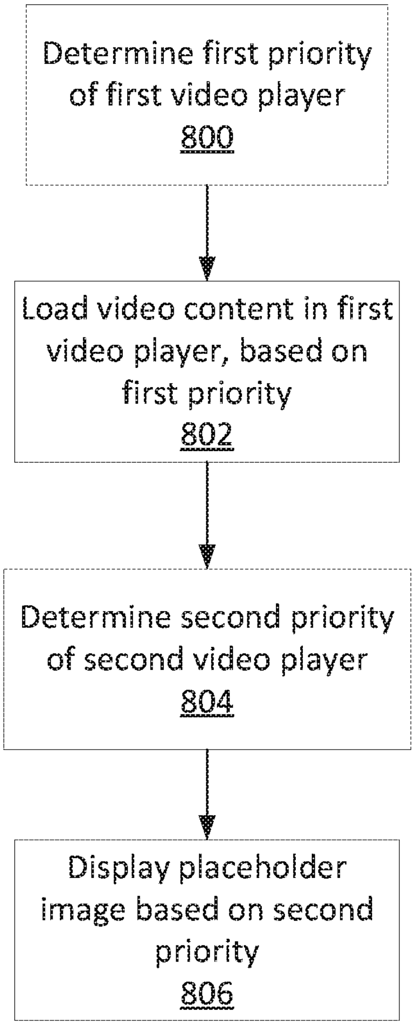
FIG. 8 illustrates an exemplary method of priority loading of videos according to examples of the disclosure.

FIG. 8 illustrates an exemplary method of priority loading of videos according to examples of the disclosure. A first priority of a first video player may be determined (800), and a second priority of a second video player may be determined (804). In some examples, the first and second priorities may be determined based on the relative positions of the first and second video players in the channel bar. For example, a video player in the center of the channel bar may have a higher priority than a video to the leftmost or rightmost edge of the channel bar, such that a central video may load before other videos. In some examples, a leftmost video player in the channel bar may have a higher priority than other videos in the channel bar, such that the videos load left to right.

Video content may be loaded in the first video player based on the first priority of the first video player (802), and a placeholder image may be displayed in place of the second video player based on the second priority of the second video player (806). After determining priority, the loading of videos may proceed based on priority. For example, a video with a first priority may load before a video with a second priority if the first priority is higher than the second priority. For relatively low priority video players, a placeholder image may be displayed in the video player's place until the video is loaded.

Figure 9:
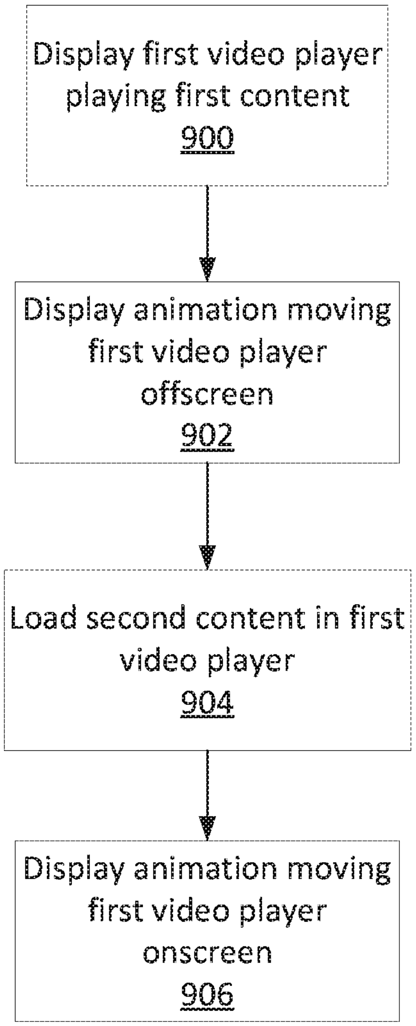
FIG. 9 illustrates an exemplary method of reusing an allocated video player according to examples of the disclosure.

FIG. 9 illustrates an exemplary method of reusing an allocated video player according to examples of the disclosure. A first video player playing first video content may be displayed (900). Then, an animation moving the first video player to an offscreen position may be displayed (902). As discussed above, an example of such an animation is illustrated in FIGS. 5A-B, where video 104 moves to the left with respect to user interface 100 until it is no longer displayed in FIG. 5B.

The first video player may then be reused for other video content, and second video content may be loaded in the first video player (904). Then, an animation moving the first video player to an onscreen position may be displayed, with the first video player now playing the second video content (906).

In some examples, the first video player may be repositioned prior to the animation moving the first video player back onscreen, such that the video player appears to come in from a different side of the user interface. For example, FIGS. 5A-B illustrate video 104 moving off the left edge of the user interface 100. The video player corresponding to video 104 may then be loaded with video content for video 114, and the video player may be repositioned to the right side of the user interface, so that video 114 can move into the user interface from its right edge.

Figure 10:
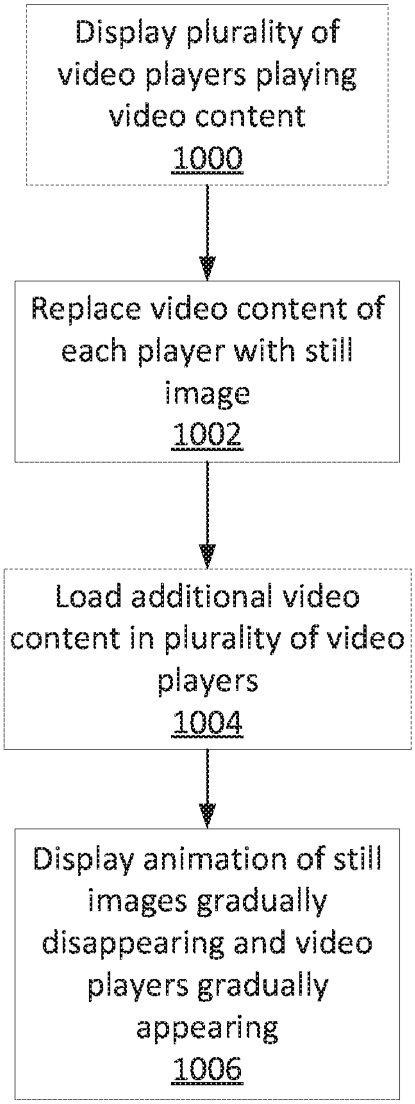
FIG. 10 illustrates an exemplary method of reusing a plurality of allocated video players at once according to examples of the disclosure.

FIG. 10 illustrates an exemplary method of reusing a plurality of allocated video players at once according to examples of the disclosure. A plurality of video players playing video content may be displayed (1000). In preparation for a vertical scroll, as illustrated in FIGS. 6A-D, video content of each player may be replaced with a still image (1002). For example, each video content may be replaced with a still image of the last frame displayed of the corresponding video content.

Then, additional video content may then be loaded into the plurality of video players (1004), and an animation of the still images gradually disappearing and the video players gradually appearing may be displayed (1006). In some examples, the animation may be a vertical scroll as illustrated in FIGS. 6A-D, although many other examples are possible, such as a gradual fade in/out or a gradual change in size.

The plurality of video players may be repositioned with respect to the user interface 100 prior to the animation, such that the video players appear to come in from a different side of the user interface. For example, in FIGS. 6A-D, the plurality of video players may be repositioned below the bottom edge of the user interface 100 prior to the animation, such that the videos appear to emerge from the bottom edge of the user interface.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., spreadsheet apps) utilizing touch input as an input mechanism. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one example, call APIs from different providers such as a set of APIs from an OS provider and another set of APIs from a plug-in provider and another set of APIs from another provider (e.g. the provider of a software library) or creator of the another set of APIs.

Figure 11:
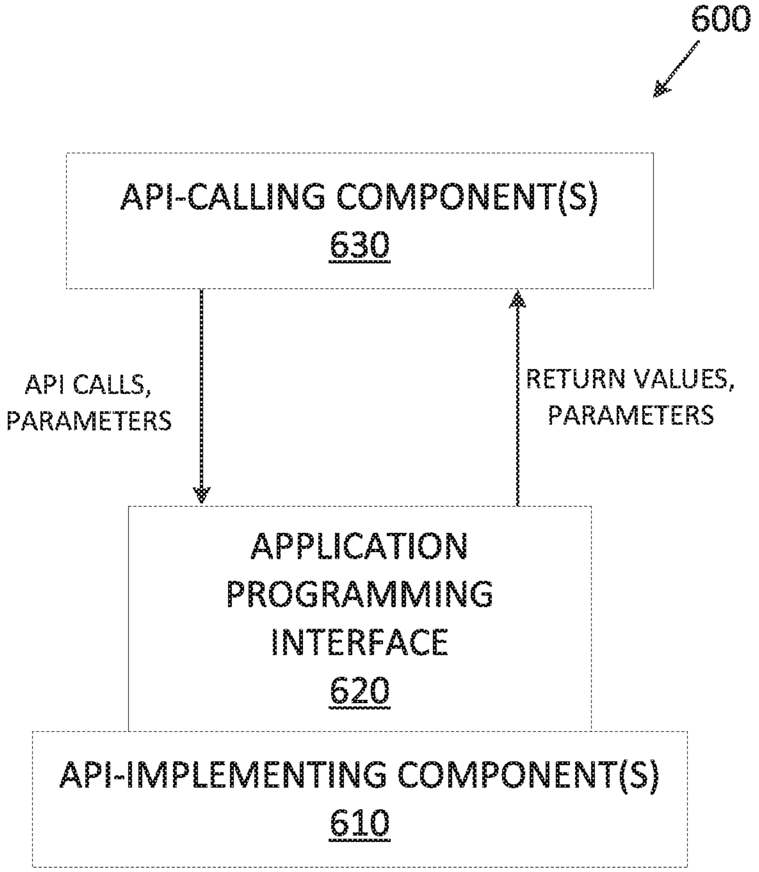
FIG. 11 is a block diagram illustrating an exemplary API architecture, which may be used in some examples of the disclosure.

FIG. 11 is a block diagram illustrating an exemplary API architecture, which may be used in some examples of the disclosure. As shown in FIG. 11, the API architecture 600 includes the API-implementing component 610 (e.g., an operating system, a library, a device driver, an API, an application program, software or other module) that implements the API 620. The API 620 specifies one or more functions, methods, classes, objects, protocols, data structures, formats and/or other features of the API-implementing component that may be used by the API-calling component 630. The API 620 can specify at least one calling convention that specifies how a function in the API-implementing component receives parameters from the API-calling component and how the function returns a result to the API-calling component. The API-calling component 630 (e.g., an operating system, a library, a device driver, an API, an application program, software or other module), makes API calls through the API 620 to access and use the features of the API-implementing component 610 that are specified by the API 620. The API-implementing component 610 may return a value through the API 620 to the API-calling component 630 in response to an API call.

It will be appreciated that the API-implementing component 610 may include additional functions, methods, classes, data structures, and/or other features that are not specified through the API 620 and are not available to the API-calling component 630. It should be understood that the API-calling component 630 may be on the same system as the API-implementing component 610 or may be located remotely and accesses the API-implementing component 610 using the API 620 over a network. While FIG. 11 illustrates a single API-calling component 630 interacting with the API 620, it should be understood that other API-calling components, which may be written in different languages (or the same language) than the API-calling component 630, may use the API 620.

The API-implementing component 610, the API 620, and the API-calling component 630 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 12:
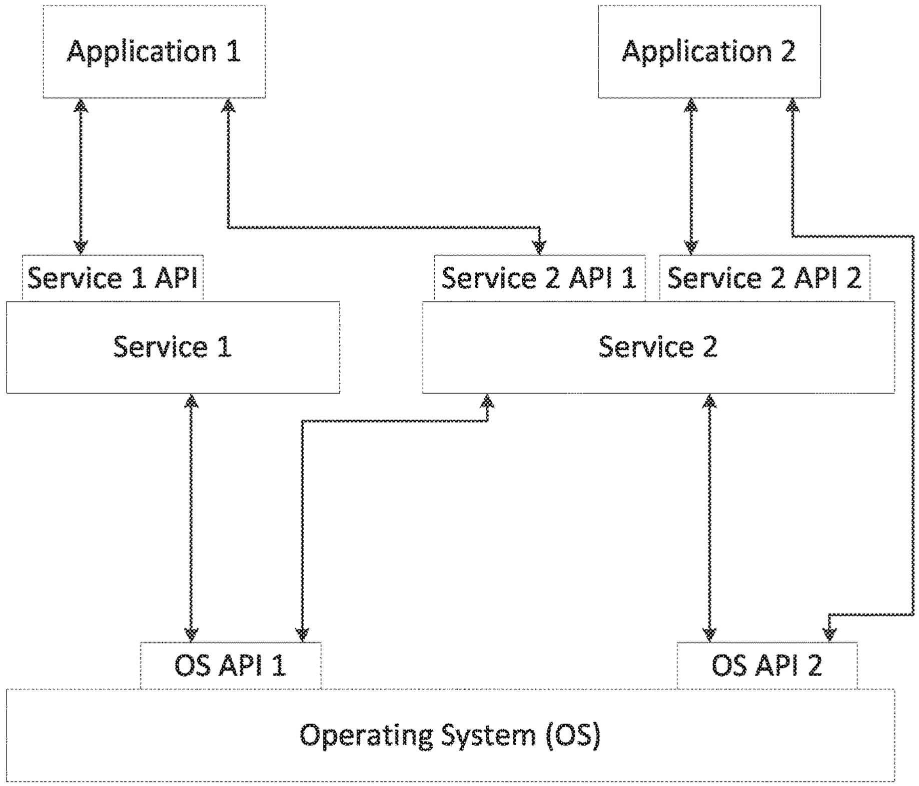
FIG. 12 illustrates an exemplary software stack of an API according to examples of the disclosure.

In the exemplary software stack shown in FIG. 12, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 13:
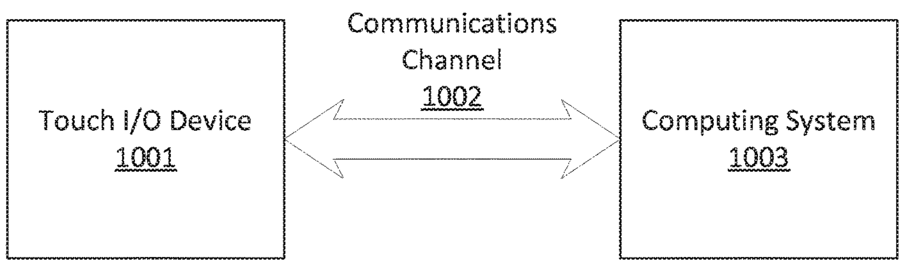
FIG. 13 is a block diagram illustrating exemplary interactions between the touch screen and other components of the device according to examples of the disclosure.

FIG. 13 is a block diagram illustrating exemplary interactions between the touch screen and the other components of the device. Described examples may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a smartphone or a tablet PC) or may be separate from computing system 1003.

Touch I/O device 1001 may include a touch sensing panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensing surface for receiving touch input.

In one example, touch I/O device 1001 embodied as a touch screen may include a transparent and/or semitransparent touch sensing panel partially or wholly positioned over at least a portion of a display. According to this example, touch I/O device 1001 functions to display graphical data transmitted from computing system 1003 (and/or another source) and also functions to receive user input. In other examples, touch I/O device 1001 may be embodied as an integrated touch screen where touch sensing components/devices are integral with display components/devices. In still other examples a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other examples, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other examples in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 14:
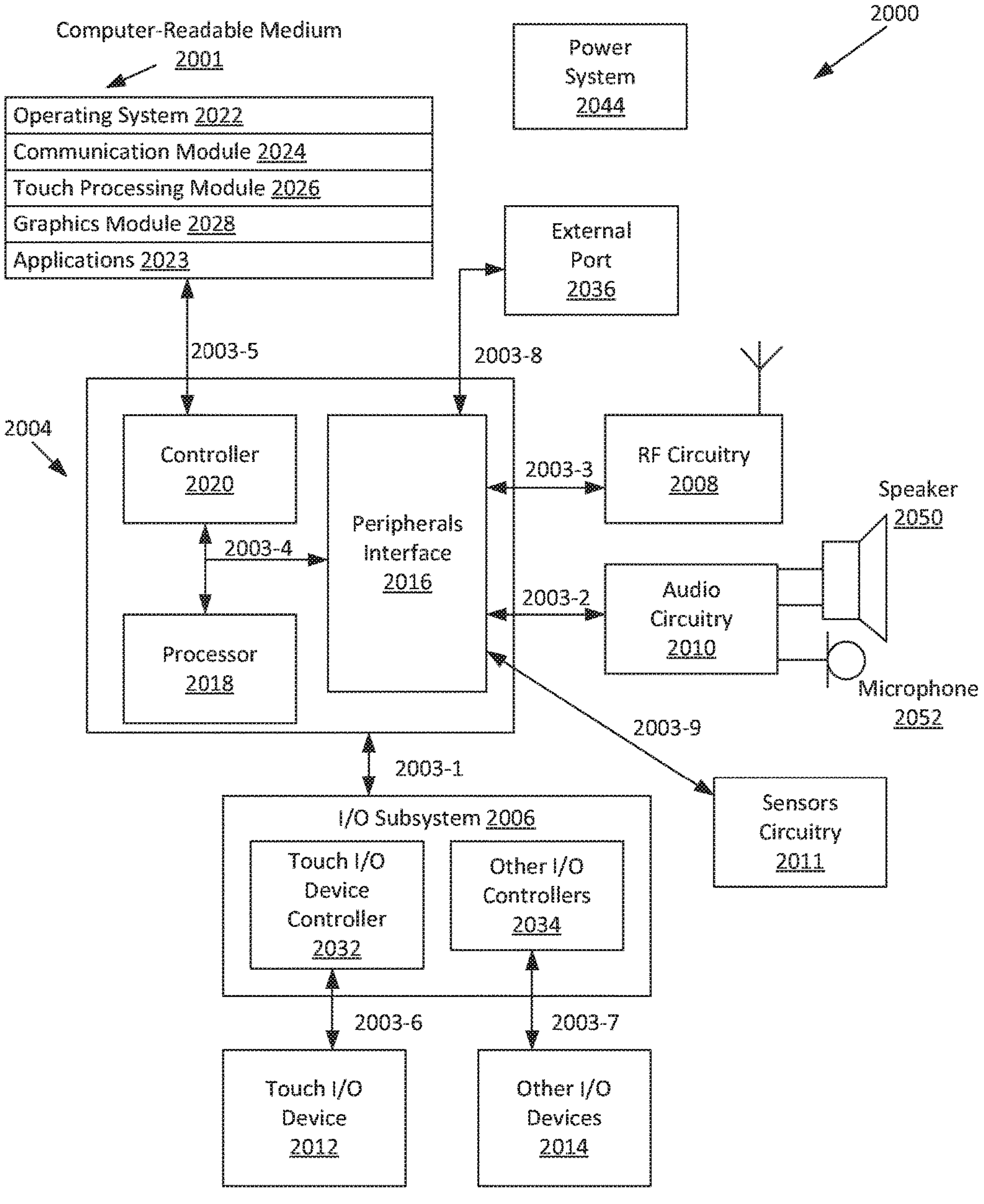
FIG. 14 is a block diagram illustrating an example of a system architecture that may be embodied within any portable or non-portable device according to examples of the disclosure.

Attention is now directed towards examples of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 14 is a block diagram of one example of system 2000 that generally includes one or more computer-readable mediums 2001, processing system 2004, I/O subsystem 2006, radio frequency (RF) circuitry 2008, audio circuitry 2010, and sensors circuitry 2011. These components may be coupled by one or more communication buses or signal lines 2003.

It should be apparent that the architecture shown in FIG. 14 is only one example architecture of system 2000, and that system 2000 could have more or fewer components than shown, or a different configuration of components. The various components shown in FIG. 14 can be implemented in hardware, software, firmware or any combination thereof, including one or more signal processing and/or application specific integrated circuits.

RF circuitry 2008 can be used to send and receive information over a wireless link or network to one or more other devices and includes well-known circuitry for performing this function. RF circuitry 2008 and audio circuitry 2010 can be coupled to processing system 2004 via peripherals interface 2016. Interface 2016 can include various known components for establishing and maintaining communication between peripherals and processing system 2004. Audio circuitry 2010 can be coupled to audio speaker 2050 and microphone 2052 and can include known circuitry for processing voice signals received from interface 2016 to enable a user to communicate in real-time with other users. In some examples, audio circuitry 2010 can include a headphone jack (not shown). Sensors circuitry 2011 can be coupled to various sensors including, but not limited to, one or more Light Emitting Diodes (LEDs) or other light emitters, one or more photodiodes or other light sensors, one or more photothermal sensors, a magnetometer, an accelerometer, a gyroscope, a barometer, a compass, a proximity sensor, a camera, an ambient light sensor, a thermometer, a GPS sensor, and various system sensors which can sense remaining battery life, power consumption, processor speed, CPU load, and the like.

Peripherals interface 2016 can couple the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. In some examples, medium 2001 can be a non-transitory computer-readable storage medium. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 can run various software components stored in medium 2001 to perform various functions for system 2000. In some examples, the software components can include operating system 2022, communication module (or set of instructions) 2024, touch processing module (or set of instructions) 2026, graphics module (or set of instructions) 2028, and one or more applications (or set of instructions) 2030. Each of these modules and above noted applications can correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various examples. In some examples, medium 2001 may store a subset of the modules and data structures identified above. Furthermore, medium 2001 may store additional modules and data structures not described above.

Operating system 2022 can include various procedures, sets of instructions, software components and/or drivers for controlling and managing general system tasks (e.g., memory management, storage device control, power management, etc.) and facilitates communication between various hardware and software components.

Communication module 2024 can facilitate communication with other devices over one or more external ports 2036 or via RF circuitry 2008 and can include various software components for handling data received from RF circuitry 2008 and/or external port 2036.

Graphics module 2028 can include various known software components for rendering, animating and displaying graphical objects on a display surface. In examples in which touch I/O device 2012 is a touch sensing display (e.g., touch screen), graphics module 2028 can include components for rendering, displaying, and animating objects on the touch sensing display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 can include various software components for performing various tasks associated with touch I/O device 2012 including but not limited to receiving and processing touch input received from I/O device 2012 via touch I/O device controller 2032.

I/O subsystem 2006 can be coupled to touch I/O device 2012 and one or more other I/O devices 2014 for controlling or performing various functions. Touch I/O device 2012 can communicate with processing system 2004 via touch I/O device controller 2032, which can include various components for processing user touch input (e.g., scanning hardware). One or more other input controllers 2034 can receive/send electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 can display visual output to the user in a GUI. The visual output may include text, graphics, video, and any combination thereof. Some or all of the visual output may correspond to user-interface objects. Touch I/O device 2012 can form a touch sensing surface that accepts touch input from the user. Touch I/O device 2012 and touch screen controller 2032 (along with any associated modules and/or sets of instructions in medium 2001) can detect and track touches or near touches (and any movement or release of the touch) on touch I/O device 2012 and can convert the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensing surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

In examples for which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 can also include power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 2016, one or more processors 2018, and memory controller 2020 may be implemented on a single chip, such as processing system 2004. In some other examples, they may be implemented on separate chips.

Examples of the disclosure can be advantageous in allowing for bandwidth management of an electronic device displaying a plurality of videos simultaneously, allowing for uninterrupted video playback at a high quality.

In some examples, a computer-implemented method of an electronic device is disclosed. The method may include: displaying a first video at a first bitrate, the first video being available for display at first and second bitrates, the second bitrate being lower than the first bitrate; and in response to user input, displaying a plurality of additional videos and reducing the bitrate of the first video from the first bitrate to the second bitrate. Additionally or alternatively to one or more of the above examples, the plurality of additional videos may include a second video being displayed at a third bitrate, the second video being available for display at third and fourth bitrates, the fourth bitrate being higher than the third bitrate, and the method may further include: in response to user input browsing to the second video, loading the second video at the fourth bitrate; and in response to user input selecting the second video, displaying the second video at the fourth bitrate. Additionally or alternatively to one or more of the above examples, the second video may be further available for display at a fifth bitrate, the fifth bitrate being higher than the fourth bitrate, and the method may further include: in response to the user input selecting the second video, loading the second video at the fifth bitrate; determining the second video can be displayed at the fifth bitrate; and in response to determining the second video can be displayed at the fifth bitrate, displaying the second video at the fifth bitrate. Additionally or alternatively to one or more of the above examples, determining the second video can be displayed at the fifth bitrate may include determining that enough of the second video has been loaded at the fifth bitrate such that the second video can be displayed at the fifth bitrate without interruption. Additionally or alternatively to one or more of the above examples, determining the second video can be displayed at the fifth bitrate may be based on bandwidth capabilities of the electronic device. Additionally or alternatively to one or more of the above examples, the plurality of additional videos may include a second video, and displaying the plurality of additional videos may not include loading audio associated with the second video, and the method may further include: in response to user input browsing to the second video, loading audio associated with the second video. Additionally or alternatively to one or more of the above examples, the method may further include displaying a channel bar, wherein displaying the channel bar may include displaying the plurality of additional videos. Additionally or alternatively to one or more of the above examples, each of the first and second bitrates may be associated with one or more of a resolution and a quality level.

In some examples, a computer-implemented method of an electronic device is disclosed. The method may include: allocating in memory a pool of video players for a channel bar; and displaying only a first subset of the video players, each video player of the first subset playing video content, wherein a second subset of the video players may not be displayed. Additionally or alternatively to one or more of the above examples, displaying the first subset of the video players may include: determining a first priority of a first video player; loading video content of the first video player based on the first priority of the first video player; determining a second priority of a second video player; and displaying a placeholder image in place of the second video player based on the second priority of the second video player. Additionally or alternatively to one or more of the above examples, the first and second priorities may be determined based on the relative positions of the first and second video players in the channel bar. Additionally or alternatively to one or more of the above examples, the method may further include: displaying an animation including moving a first video player of the first subset to an offscreen position and moving a second video player of the second subset to an onscreen position, such that the first video player may no longer be displayed and the second video player may be displayed. Additionally or alternatively to one or more of the above examples, the second video player may begin loading video content prior to displaying the animation. Additionally or alternatively to one or more of the above examples, the method may further include: determining an additional video player is needed; allocating in memory the additional video player for the pool; and displaying the additional video player. Additionally or alternatively to one or more of the above examples, the method may further include: displaying a first video player of the first subset playing first video content; displaying an animation moving the first video player to an offscreen position; loading second video content in the first video player; and displaying an animation moving the first video player to an onscreen position. Additionally or alternatively to one or more of the above examples, the method may further include: determining a maximum number of video players for the pool based on a constraint of the electronic device. Additionally or alternatively to one or more of the above examples, the constraint of the electronic device may include a bandwidth constraint. Additionally or alternatively to one or more of the above examples, the method may further include: replacing each video player of the first subset with a still image; loading additional video content in each video player of the first subset; and displaying an animation of the still images gradually disappearing and the first subset of video players gradually appearing.

In some examples, a non-transitory computer readable medium is disclosed. The computer readable medium may contain instructions that, when executed, perform a method including: displaying a first video at a first bitrate, the first video being available for display at first and second bitrates, the second bitrate being lower than the first bitrate; and in response to user input, displaying a plurality of additional videos and reducing the bitrate of the first video from the first bitrate to the second bitrate. Additionally or alternatively to one or more of the above examples, the plurality of additional videos may include a second video being displayed at a third bitrate, the second video being available for display at third and fourth bitrates, the fourth bitrate being higher than the third bitrate, and the method may further include: in response to user input browsing to the second video, loading the second video at the fourth bitrate; and in response to user input selecting the second video, displaying the second video at the fourth bitrate. Additionally or alternatively to one or more of the above examples, the second video may be further available for display at a fifth bitrate, the fifth bitrate being higher than the fourth bitrate, and the method may further include: in response to the user input selecting the second video, loading the second video at the fifth bitrate; determining the second video can be displayed at the fifth bitrate; and in response to determining the second video can be displayed at the fifth bitrate, displaying the second video at the fifth bitrate. Additionally or alternatively to one or more of the above examples, determining the second video can be displayed at the fifth bitrate may include determining that enough of the second video has been loaded at the fifth bitrate such that the second video can be displayed at the fifth bitrate without interruption. Additionally or alternatively to one or more of the above examples, determining the second video can be displayed at the fifth bitrate may be based on bandwidth capabilities of the electronic device. Additionally or alternatively to one or more of the above examples, the plurality of additional videos may include a second video, and displaying the plurality of additional videos may not include loading audio associated with the second video, and the method may further include: in response to user input browsing to the second video, loading audio associated with the second video. Additionally or alternatively to one or more of the above examples, the method may further include displaying a channel bar, wherein displaying the channel bar may include displaying the plurality of additional videos. Additionally or alternatively to one or more of the above examples, each of the first and second bitrates may be associated with one or more of a resolution and a quality level.

In some examples, a non-transitory computer readable medium is disclosed. The computer readable medium may contain instructions that, when executed, perform a method including: allocating in memory a pool of video players for a channel bar; and displaying only a first subset of the video players, each video player of the first subset playing video content, wherein a second subset of the video players may not be displayed. Additionally or alternatively to one or more of the above examples, displaying the first subset of the video players may include: determining a first priority of a first video player; loading video content of the first video player based on the first priority of the first video player; determining a second priority of a second video player; and displaying a placeholder image in place of the second video player based on the second priority of the second video player. Additionally or alternatively to one or more of the above examples, the first and second priorities may be determined based on the relative positions of the first and second video players in the channel bar. Additionally or alternatively to one or more of the above examples, the method may further include: displaying an animation including moving a first video player of the first subset to an offscreen position and moving a second video player of the second subset to an onscreen position, such that the first video player may no longer be displayed and the second video player may be displayed. Additionally or alternatively to one or more of the above examples, the second video player may begin loading video content prior to displaying the animation. Additionally or alternatively to one or more of the above examples, the method may further include: determining an additional video player is needed; allocating in memory the additional video player for the pool; and displaying the additional video player. Additionally or alternatively to one or more of the above examples, the method may further include: displaying a first video player of the first subset playing first video content; displaying an animation moving the first video player to an offscreen position; loading second video content in the first video player; and displaying an animation moving the first video player to an onscreen position. Additionally or alternatively to one or more of the above examples, the method may further include: determining a maximum number of video players for the pool based on a constraint of the electronic device. Additionally or alternatively to one or more of the above examples, the constraint of the electronic device may include a bandwidth constraint. Additionally or alternatively to one or more of the above examples, the method may further include: replacing each video player of the first subset with a still image; loading additional video content in each video player of the first subset; and displaying an animation of the still images gradually disappearing and the first subset of video players gradually appearing.

In some examples, an electronic device is disclosed. The electronic device may include a processor to execute instructions and a memory coupled with the processor to store instructions, which when executed by the processor, cause the processor to perform operations to generate an application programming interface (API) that allows an API-calling component to perform a method including: displaying a first video at a first bitrate, the first video being available for display at first and second bitrates, the second bitrate being lower than the first bitrate; and in response to user input, displaying a plurality of additional videos and reducing the bitrate of the first video from the first bitrate to the second bitrate. Additionally or alternatively to one or more of the above examples, the plurality of additional videos may include a second video being displayed at a third bitrate, the second video being available for display at third and fourth bitrates, the fourth bitrate being higher than the third bitrate, and the method may further include: in response to user input browsing to the second video, loading the second video at the fourth bitrate; and in response to user input selecting the second video, displaying the second video at the fourth bitrate. Additionally or alternatively to one or more of the above examples, the second video may be further available for display at a fifth bitrate, the fifth bitrate being higher than the fourth bitrate, and the method may further include: in response to the user input selecting the second video, loading the second video at the fifth bitrate; determining the second video can be displayed at the fifth bitrate; and in response to determining the second video can be displayed at the fifth bitrate, displaying the second video at the fifth bitrate. Additionally or alternatively to one or more of the above examples, determining the second video can be displayed at the fifth bitrate may include determining that enough of the second video has been loaded at the fifth bitrate such that the second video can be displayed at the fifth bitrate without interruption. Additionally or alternatively to one or more of the above examples, determining the second video can be displayed at the fifth bitrate may be based on bandwidth capabilities of the electronic device. Additionally or alternatively to one or more of the above examples, the plurality of additional videos may include a second video, and displaying the plurality of additional videos may not include loading audio associated with the second video, and the method may further include: in response to user input browsing to the second video, loading audio associated with the second video. Additionally or alternatively to one or more of the above examples, the method may further include displaying a channel bar, wherein displaying the channel bar may include displaying the plurality of additional videos. Additionally or alternatively to one or more of the above examples, each of the first and second bitrates may be associated with one or more of a resolution and a quality level.

In some examples, an electronic device is disclosed. The electronic device may include a processor to execute instructions and a memory coupled with the processor to store instructions, which when executed by the processor, cause the processor to perform operations to generate an application programming interface (API) that allows an API-calling component to perform a method including: allocating in memory a pool of video players for a channel bar; and displaying only a first subset of the video players, each video player of the first subset playing video content, wherein a second subset of the video players may not be displayed. Additionally or alternatively to one or more of the above examples, displaying the first subset of the video players may include: determining a first priority of a first video player; loading video content of the first video player based on the first priority of the first video player; determining a second priority of a second video player; and displaying a placeholder image in place of the second video player based on the second priority of the second video player. Additionally or alternatively to one or more of the above examples, the first and second priorities may be determined based on the relative positions of the first and second video players in the channel bar. Additionally or alternatively to one or more of the above examples, the method may further include: displaying an animation including moving a first video player of the first subset to an offscreen position and moving a second video player of the second subset to an onscreen position, such that the first video player may no longer be displayed and the second video player may be displayed. Additionally or alternatively to one or more of the above examples, the second video player may begin loading video content prior to displaying the animation. Additionally or alternatively to one or more of the above examples, the method may further include: determining an additional video player is needed; allocating in memory the additional video player for the pool; and displaying the additional video player. Additionally or alternatively to one or more of the above examples, the method may further include: displaying a first video player of the first subset playing first video content; displaying an animation moving the first video player to an offscreen position; loading second video content in the first video player; and displaying an animation moving the first video player to an onscreen position. Additionally or alternatively to one or more of the above examples, the method may further include: determining a maximum number of video players for the pool based on a constraint of the electronic device. Additionally or alternatively to one or more of the above examples, the constraint of the electronic device may include a bandwidth constraint. Additionally or alternatively to one or more of the above examples, the method may further include: replacing each video player of the first subset with a still image; loading additional video content in each video player of the first subset; and displaying an animation of the still images gradually disappearing and the first subset of video players gradually appearing.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A computer-implemented method of an electronic device, the method comprising:

displaying a first video at a first size and at a first bitrate, the first video being available for display at first and second bitrates, the second bitrate being lower than the first bitrate; and in response to user input, while concurrently displaying the first video at the first size, displaying a channel bar including a plurality of additional videos and reducing the bitrate of the first video from the first bitrate to the second bitrate.

2. The method of claim 1, wherein the plurality of additional videos includes a second video being displayed at a third bitrate, the second video being available for display at third and fourth bitrates, the fourth bitrate being higher than the third bitrate, the method further comprising:

in response to user input browsing to the second video, loading the second video at the fourth bitrate; and in response to user input selecting the second video, displaying the second video at the fourth bitrate.

3. The method of claim 2, wherein the second video is further available for display at a fifth bitrate, the fifth bitrate being higher than the fourth bitrate, the method further comprising:

in response to the user input selecting the second video, loading the second video at the fifth bitrate;

determining the second video can be displayed at the fifth bitrate; and in response to determining the second video can be displayed at the fifth bitrate, displaying the second video at the fifth bitrate.

4. The method of claim 3, wherein determining the second video can be displayed at the fifth bitrate includes determining that enough of the second video has been loaded at the fifth bitrate such that the second video can be displayed at the fifth bitrate without interruption.

5. The method of claim 3, wherein determining the second video can be displayed at the fifth bitrate is based on bandwidth capabilities of the electronic device.

6. The method of claim 1, wherein the plurality of additional videos includes a second video, and displaying the plurality of additional videos does not include loading audio associated with the second video, the method further comprising:

in response to user input browsing to the second video, loading audio associated with the second video.

7. The method of claim 1, wherein each of the first and second bitrates are associated with one or more of a resolution and a quality level.

8. A non-transitory computer readable medium, the computer readable medium containing instructions that, when executed, perform a method of an electronic device, the method comprising:

displaying a first video at a first size and at a first bitrate, the first video being available for display at first and second bitrates, the second bitrate being lower than the first bitrate; and in response to user input, while concurrently displaying the first video at the first size, displaying a channel bar including a plurality of additional videos and reducing the bitrate of the first video from the first bitrate to the second bitrate.

9. The non-transitory computer readable medium of claim 8, wherein the plurality of additional videos includes a second video being displayed at a third bitrate, the second video being available for display at third and fourth bitrates, the fourth bitrate being higher than the third bitrate, the method further comprising:

in response to user input browsing to the second video, loading the second video at the fourth bitrate; and in response to user input selecting the second video, displaying the second video at the fourth bitrate.

10. The non-transitory computer readable medium of claim 9, wherein the second video is further available for display at a fifth bitrate, the fifth bitrate being higher than the fourth bitrate, the method further comprising:

in response to the user input selecting the second video, loading the second video at the fifth bitrate;

determining the second video can be displayed at the fifth bitrate; and in response to determining the second video can be displayed at the fifth bitrate, displaying the second video at the fifth bitrate.

11. The non-transitory computer readable medium of claim 10, wherein determining the second video can be displayed at the fifth bitrate includes determining that enough of the second video has been loaded at the fifth bitrate such that the second video can be displayed at the fifth bitrate without interruption.

12. The non-transitory computer readable medium of claim 10, wherein determining the second video can be displayed at the fifth bitrate is based on bandwidth capabilities of the electronic device.

13. The non-transitory computer readable medium of claim 8, wherein the plurality of additional videos includes a second video, and displaying the plurality of additional videos does not include loading audio associated with the second video, the method further comprising:

in response to user input browsing to the second video, loading audio associated with the second video.

14. The non-transitory computer readable medium of claim 8, wherein each of the first and second bitrates are associated with one or more of a resolution and a quality level.

15. An electronic device, comprising:

a processor to execute instructions; and a memory coupled with the processor to store instructions, which when executed by the processor, cause the processor to perform operations to generate an application programming interface (API) that allows an API-calling component to perform a method comprising:

displaying a first video at a first size and at a first bitrate, the first video being available for display at first and second bitrates, the second bitrate being lower than the first bitrate; and in response to user input, while concurrently displaying the first video at the first size, displaying a channel bar including a plurality of additional videos and reducing the bitrate of the first video from the first bitrate to the second bitrate.

16. The electronic device of claim 15, wherein the plurality of additional videos includes a second video being displayed at a third bitrate, the second video being available for display at third and fourth bitrates, the fourth bitrate being higher than the third bitrate, the method further comprising:

in response to user input browsing to the second video, loading the second video at the fourth bitrate; and in response to user input selecting the second video, displaying the second video at the fourth bitrate.

17. The electronic device of claim 16, wherein the second video is further available for display at a fifth bitrate, the fifth bitrate being higher than the fourth bitrate, the method further comprising:

in response to the user input selecting the second video, loading the second video at the fifth bitrate;

determining the second video can be displayed at the fifth bitrate; and in response to determining the second video can be displayed at the fifth bitrate, displaying the second video at the fifth bitrate.

18. The electronic device of claim 17, wherein determining the second video can be displayed at the fifth bitrate includes determining that enough of the second video has been loaded at the fifth bitrate such that the second video can be displayed at the fifth bitrate without interruption.

19. The electronic device of claim 17, wherein determining the second video can be displayed at the fifth bitrate is based on bandwidth capabilities of the electronic device.

20. The electronic device of claim 15, wherein the plurality of additional videos includes a second video, and displaying the plurality of additional videos does not include loading audio associated with the second video, the method further comprising:

in response to user input browsing to the second video, loading audio associated with the second video.

21. The electronic device of claim 15, wherein each of the first and second bitrates are associated with one or more of a resolution and a quality level.

22. A computer-implemented method of an electronic device, the method comprising:

displaying a first video at a first size and at a first bitrate, the first video being available for display at first and second bitrates, the second bitrate being lower than the first bitrate; and in response to user input, while concurrently displaying the first video at the first size, displaying a plurality of additional videos and reducing the bitrate of the first video from the first bitrate to the second bitrate.

* * * * *